3,213,157
CATALYTIC ALKYLATION METHOD AND APPARATUS
George E. Hays and Fred T. Sherk, Bartlesville, Okla., assignors to Phillips Petroleum Company, a corporation of Delaware
Filed Mar. 21, 1963, Ser. No. 267,391
10 Claims. (Cl. 260—683.48)

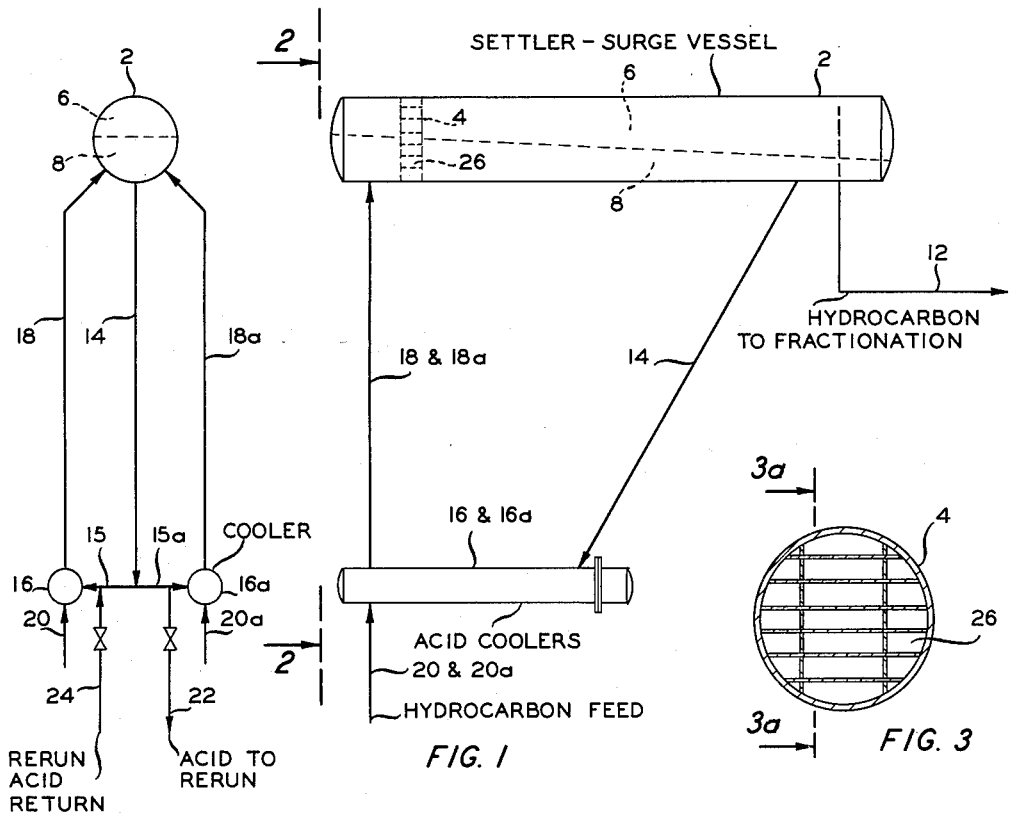
FIG. 1
FIG. 2
FIG. 3
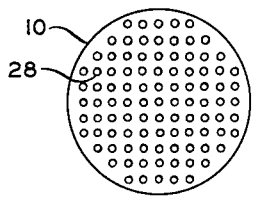
FIG. 4
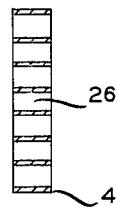
FIG. 6
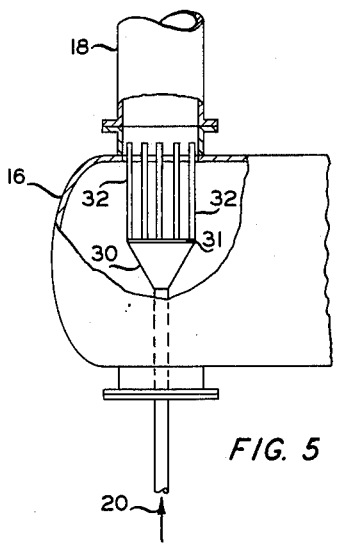
FIG. 5
INVENTORS
G. E. HAYS
F. T. SHERK
BY Hudson and Young
ATTORNEYS INVENTORS
G. E. HAYS
F. T. SHERK
BY Young and Quigg
ATTORNEYS United States Patent Office 3,213,157
Patented Oct. 19, 1965

This is a continuation-in-part of copending application Serial No. 807,454, filed April 20, 1959, now abandoned.

This application relates to the catalytic alkylation of hydrocarbons. In one aspect it relates to an alkylation system in which cyclic flow of alkylation catalyst is provided. In another aspect it relates to improved method and apparatus for separating components of an alkylation reaction effluent.

One of the major problems associated with the catalytic alkylation of hydrocarbons lies in handling the alkylation catalyst, that is, transporting the catalyst through the various parts of the reaction and recovery system. The problem is particularly aggravated when acid catalysts, such as hydrofluoric acid, sulfuric acid, etc., are used since these materials in many instances are highly corrosive to ordinary materials of construction. Special equipment such as alloy valves and vessels, special pumps and pump packings are required and special safety precautions are necessary in the alkylation of hydrocarbons with acid catalysts.

It is known that gaseous hydrocarbons will permit cyclic flow of liquid alkylation catalyst in series through a vertically elongated reaction zone, a settling zone, a cooling zone and return to said reaction zone, said zones being in open communication with each other, solely by the energy imparted to the catalyst by the gaseous hydrocarbons and density and temperature differences in said zones. The gaseous hydrocarbon feed material comprising an alkylatable hydrocarbon and an alkylating agent is introduced at a high velocity to the lower portion of the reaction zone, into a continuous catalyst phase maintained in said zone. Suitable conditions of temperature and residence time are provided in the reaction zone whereby the alkylatabl hydrocarbon is alkylated. A stream comprising alkylation catalyst, alkylate and unconsumed reactants passes from the upper portion of the reaction zone to a settling zone wherein separation occurs between hydrocarbon and catalyst phases. The hydrocarbon phase is withdrawn from the settling zone for further processing, e.g. fractionation, as required and the catalyst phase passes downwardly through the cooling zone and thereafter into the lower portion of the reaction zone.

In order to use the gas lift scheme, alkylation unit conditions are limited since the vapor feed must condense during the operation or a very large amount of acid vapor would be removed from the separator with hydrocarbon vapor. This places an extremely large heat load on the acid cooler. In fact, if an adequate isobutane to olefin ratio is used (5:1 or higher), the amount of heat removal for condensation exceeds that required for removing the heat of reaction. Since it is highly desirable to maintain low temperatures during alkylation, this is an extreme disadvantage.

It is an object of this invention to provide improved method and apparatus for the alkylation of liquid hydrocarbons, particularly the alkylation of olefins with isoparaffins.

Another object of this invention is to provide improved method and apparatus for reducing catalyst handling in the alkylation of hydrocarbons.

Still another object of this invention is to provide improved method and apparatus for separating components of an alkylation reaction effluent.

Still another object of the invention is to provide improved method and apparatus for flowing liquid reactants and liquid catalyst through a vertically extended reaction zone.

These and other objects of the invention will become more readily apparent from the following detailed discussion, drawing and appended claims.

These objects are broadly accomplished in a system providing cyclic flow of liquid alkylation catalyst sequentially through a vertically elongated reaction zone, a settling zone, a cooling zone and return to said reaction zone, solely by the energy imparted to the catalyst by the flowing liquid hydrocarbons and density differences in said zones, by the process of introducing the liquid reactants as a plurality of upwardly flowing, high velocity streams into the lower portion of the reaction zone and passing the cooled acid from the cooling zone upwardly into the lower portion of the reaction zone and upstream from the point of introduction of said liquid reactants so that said catalyst is flowing in the same direction as said mixture at the point of their initial contacting.

In one aspect of the invention the liquid reactants are introduced through a plurality of tubes of relatively small cross section which terminate within the lower portion of said reactor.

It has now been found that a liquid lift system is operable for the catalytic alkylation of hydrocarbons by employing the lighter of two non-miscible liquids to furnish the motive power. The primary motive power can come from the kinetic energy of the inlet hydrocarbon stream but preferably comes from the effect of the difference in density of the flowing streams. In the mixed stream the average or stream density is lower than the density of the cycling stream so a differential static pressure is established which is proportional to the total elevation of the two flowing streams. In order for the system to arrive at a steady state the cycling streams must develop a pressure drop equal to the static pressure head developed plus the kinetic head obtained from the inlet motive stream. It is obviously possible to use the heavier liquid as the motive stream if one desires a downward flowing mixed phase stream.

By the utilization of constricted passageways of a small cross-section relative to the interior of the reaction zone, the liquid hydrocarbons form small droplets which assist in the maintenance of a high interfacial area during their life in the reactor. A high rate of reaction requires the maintenance of a high interfacial area. The direction of flow of the liquid hydrocarbons in relation to the direction of flow of the liquid acid catalyst is also important. The catalyst flow path must be established in the same direction as the hydrocarbon feed at the point of initial contact with the liquid hydrocarbon. By this method and apparatus there is no sustained build-up of catalyst or hydrocarbon or mixture at the point of contact such as would be the case if the acid catalyst were introduced above the point of introduction of the hydrocarbons or if the catalyst were introduced at right angles to the direction of flow of the hydrocarbon. Also, by introducing a high velocity stream of flowing hydrocarbons into a stream of acid catalyst flowing in the same direction, the droplets of liquid reactants retain their small size while flowing upwardly with the catalyst phase, thereby maintaining their high interfacial area. Further, as confirmed by Bernoulli's Theorem, the use of a high velocity results in a low static pressure which permits improved penetration of the one phase into the other phase. Further, by maintaining a high interfacial area and by eliminating the stagnant pool, there is a minimum of undesirable side reactions.

Preferably these constricted passageways or tubes have a diameter sufficient to provide a differential velocity between the upwardly flowing hydrocarbons and upwardly flowing catalyst of 15 to 35 feet per second. Preferably these tubes have an internal diameter of ¼" to ¾".

In general any of the conventional catalytic alkylation reactions can be carried out by the method and with the apparatus of the present invention. Thus, the alkylation reaction can comprise reaction of an isoparaffin with an olefin or other alkylatable material, reaction of a normal paraffin with an olefin or other alkylatable material, or reaction of an aromatic hydrocarbon with an olefin or other alkylatable material; the reaction in each instance being carried out in the presence of a suitable alkylation catalyst. In place of an olefin as the alkylatable material, various alcohols and ethers, such as isopropyl alcohol, tert-butyl alcohol, secondary butyl alcohol, isopropyl ether, and the like, can be employed with suitable alkylation catalysts. Likewise, the corresponding alkyl esters, such as the alkyl halides, sulfates, phosphates, fluorides of the olefins, may be used as the alkylatable material with an appropriate or compatible alkylation catalyst.

The alkylation reaction is carried out with the hydrocarbon reactants in the liquid phase; however, the reactants need not be normally liquid hyrocarbons. The reaction conditions can vary in temperature from sub-zero temperatures to temperatures as high as several hundred degrees Fahrenheit, and can be carried out at pressures varying from atmospheric to as high as 1000 p.s.i. and higher and space velocities from about 0.1 to about 20. A variety of alkylation catalysts can be employed in the alkylation reaction, including well-known catalysts, such as sulfuric acid, hydrofluoric acid, phosphoric acid; metal halides, such as aluminum chloride, aluminum bromide, etc., and other liquid alkylation catalysts. While generally applicable to the alkylation of hydrocarbons, the present invention is particularly effective for the alkylation of low boiling olefins like ethylene, propylene, butenes, pentenes, etc., with saturated branched chain paraffins, such as isobutane, in the presence of hydrofluoric acid. In the alkylation of isoparaffins with olefins a substantial molar excess of isoparaffin to olefin is employed, usually to provide a feed ratio in excess of 1:1, usually from about 4:1 to about 20:1 and preferably about 10:1 to 15:1. The reaction zone is maintained under sufficient pressure to ensure that the hydrocarbon reactants and alkylation catalysts are in the liquid phase. The temperature of the reaction will vary with the reactants and with the catalysts employed, but generally ranges from between about −40° F. to about 150° F.

The invention is best described by reference to the accompanying drawings of which:

FIGURE 1 is a diagrammatic illustration of vertical alkylation reactor, effluent settler and alkylation catalyst cooler provided in an arrangement suitable for carrying out the invention;

FIGURE 2 is a section through the apparatus arrangement of FIGURE 1;

FIGURE 3 is a straightening vane arrangement suitable for use in the settler of FIGURES 1 and 2;

FIGURE 3(a) is a section through the straightening vane apparatus of FIGURE 3;

FIGURE 4 is a perforated baffle suitable for use in the settlers of FIGURES 1 and 2;

FIGURE 5 is a diagrammatic illustration in cross-section of the hydrocarbon feed inlet to the reactors of FIGURES 1 and 2; and FIGURE 6 is a top view of the orifice plate used in the hydrocarbon feed inlet of FIGURE 5.

Figure 7:
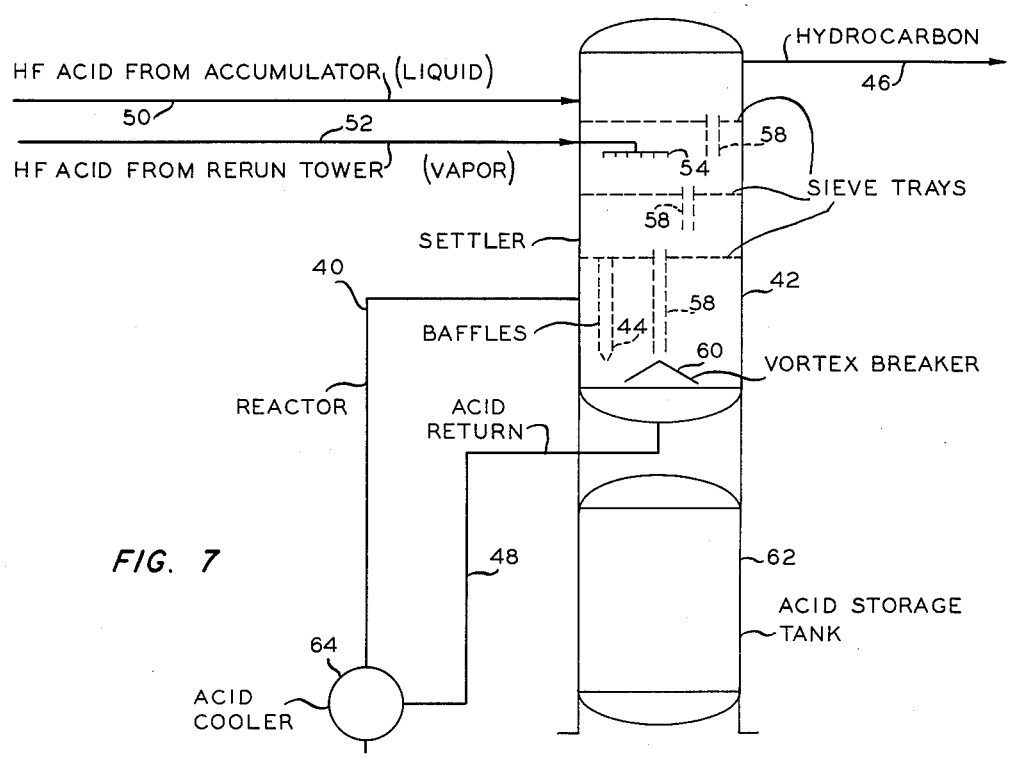
FIGURE 7 is a diagrammatic illustration and cross-section of a vertical alkylation reactor, a vertical settling vessel and a catalyst cooler.

Referring to the drawing, 18 and 18a are vertically elongated tubular reactors which are in open communication at the top with one end of a horizontally elongated settler surge vessel 2. Disposed in the settler and surge vessel, adjacent to the reactor openings, is a section 4 containing straightening vanes 26 positioned perpendicular to the longitudinal axis of the settler vessel and disposed across the entire cross-section of said vessel. At the opposite end of the settler surge vessel an outlet conduit 12 is provided for the removal of product, said outlet opening in an intermediate region of said vessel. A bottom outlet conduit 14 is provided at the same end of the settler and surge vessel as outlet 12. Outlet 14, which openly communicates with the settler and surge vessel at its upper terminus, is connected at its lower terminus with coolers 16 and 16a through conduits 15 and 15a, respectively. The bottoms of reactors 18 and 18a are in open communication with coolers 16 and 16a, respectively, at the ends of the coolers opposite from the connections with conduits 15 and 15a. Hydrocarbon feed conduits 20 and 20a are provided in coolers 16 and 16a, respectively, opening to the bottoms of said coolers and in alignment with reactors 18 and 18a, respectively. Referring to FIGURE 5, it is noted that conduit 20, after entering cooler 16, swages outwardly to orifice plate 31 containing a plurality of conduits 32 of small cross-section, which terminate within the bottom opening of reactor 18. FIGURE 6 presents a top view of orifice plate 31 and the extended conduits 32. The same type of construction is utilized for feed conduit 20a.

In the operation of the apparatus a liquid hydrocarbon feed material comprising an alkylatable hydrocarbon, such as a low boiling olefin and an alkylating agent, such as a low boiling isoparaffin, admixed in suitable proportions, is introduced in substantially equal quantities through conduits 20 and 20a, passing upwardly through coolers 16, 16a and into the bottom of reactors 18 and 18a as a plurality of high velocity streams of small cross-section. Initially, the reactors and coolers contain a quantity of alkylation catalyst, for example, hydrofluoric acid, such that the level of catalyst extends a substantial distance up into the reactors. The catalyst present in the alkylation system substantially exceeds in quantity the amount of hydrocarbon and therefore constitutes the continuous phase in said system. The hydrocarbon feed entering the reaction zones separates into small droplets which pass upwardly through the reactors 18 and 18a. Acid catalyst present in the reactors and additional catalyst entrained in the hydrocarbons from conduits 15 and 15a, respectively, passes upwardly through the reactors in co-current flow with the hydrocarbon feed. The simultaneous upward movement of acid and hydrocarbon results from a combination of (1) the kinetic energy of the hydrocarbon feed, and (2) the difference in density of the acid-hydrocarbon mixture in reactors 18 and 18a as compared to the continuous acid phase in conduit 14. As the acid catalyst and hydrocarbon reactants come in contact, reaction between the olefin and isoparaffin occurs, with the formation of higher molecular weight materials of increased octane value. The reaction being exothermic, the temperature of the acid and reactants increases as the reaction mixture moves upwardly through the reactors. Within a very short period of time, usually on the order of 1 to 30 seconds, the alkylation reaction is completed, after which reaction effluent containing hydrocarbon product (alkylate), acid catalyst and unreacted feed hydrocarbons passes from the reactors, entering the upstream end of the settler surge vessel 2. The change in direction and cross-section of flow of the effluent entering the surge vessel causes turbulence in the reaction effluent, which hinders separation of the hydrocarbon and acid into separate phases. To aid in reducing turbulence and shorten the time required for phase separation the effluent is passed through straightening vane section 4 which is positioned in the surge vessel adjacent the point of entry of the effluent. In the vaned section the effluent is divided into a plurality of separate parallel streams of limited cross-section in which turbulence is quickly reduced to a minimum. The vaned section, which is of limited length compared to the overall length of the settler surge vessel, can be conveniently formed of horizontal plates of a suitable construction material, preferably of minimum thickness suitable to provide the required structural strength. The thickness of the horizontal plates is desirably restricted so as to not unduly increase the velocity of the reaction effluent passing through the straightening section. Although not shown in the drawing the vaned section can be vertically subdivided rather than horizontally subdivided, or both, to provide straightening sections of flow of still smaller cross-section. The length of the straightening vanes will vary depending on the size of the settler vessel and also the flow rate of reaction effluent. Usually it is desirable to size the vanes to provide a length of flow which is from about 1 to about 4 times the distance between said vanes and preferably less than twice the distance between vanes. The distance between vanes will vary depending on the size of the settler and the amount of reaction effluent which must be separated. In a unit of commercial size the vanes are usually spaced from 3 to 12 inches apart, preferably from 6 to 9 inches. As stated previously, the vaned section is of limited length as compared to the overall length of the settler, the two being sized usually in a ratio of from about 1:10 to 1:50. It is also within the scope of the invention to provide more than one straightening section; however, if more than one section is provided it is desirable that the total length of the various sections be within the proportions of the total length of the settler, as set forth above. Where more than one straightening vane section is employed these sections can be conveniently provided in the form of a plurality of perforated baffles, being constructed from a normally solid baffle plate of limited thickness by providing perforations of suitable shape, such as squares and circles, etc. A typical example of a perforated baffle straightening section is shown in FIGURE 4. In this particular section the openings in the baffle are circular in shape. Preferably the straightening vane sections are disposed in the upstream region of the settler, adjoining or adjacent to the outlets of the vertical alkylation reactors. In this way the zone of turbulence produced by the reaction effluent on entering the settler is reduced to a minimum volume, allowing maximum utilization of the settler for separation of the effluent into separate acid and hydrocarbon phases.

Separation of the alkylation reaction effluent into acid and hydrocarbon phases, which commences with introduction of the reaction effluent to the settler surge vessel, is substantially completed by the time the effluent reaches the opposite end of said vessel. This vessel can be operated liquid full by the use of elevated pressures or it can be operated with both liquid and gas phases at lower pressures, with provision being made to vent excess gas. The upper phase or hydrocarbon phase is withdrawn from the settler surge vessel through conduit 12 and yielded for fruther treatment including fractionation (not shown) as required. The lower, acid phase passes from the settler and surge vessel downwardly through conduit 14 and is divided into substantially equal quantities in conduits 15 and 15a, through which it is introduced to coolers 16 and 16a, respectively. Acid passing through the coolers is reduced in temperature sufficiently to remove heat picked up during the alkylation reaction. As necessary, acid can be withdrawn from the system through conduit 22 for rerunning and the rerun acid (or fresh acid) can be returned to the system through conduit 24.

FIGURE 7 illustrates a slightly different arrangement of the settling vessel and eduction tubes. The alkylate containing effluent from the reactor 40 passes into an intermediate portion of the settler 42 and passes through a pair of parallel perforated baffles 44. Within the settler 42 a phase separation takes place with the hydrocarbons removed overhead through conduit 46 and the acid catalyst being removed from a lower portion of the settler through acid return conduit 48. In order to remove fluorides from the hydrocarbon product, the hydrocarbons are contacted countercurrently with fresh hydrofluoric acid. This fresh acid may include liquid hydrofluoric acid from an accumulating zone (not shown) through conduit 50. This hydrofluoric acid is substantially free of acid soluble oils. An additional quantity of vaporous hydrofluoric acid from a rerun tower (not shown) may be introduced through conduit 52 through a distribution system 54 at a slightly lower level in the upper hydrocarbon phase. This second hydrofluoric acid is also low in acid soluble oils. By this method there is the simultaneous facilitation of the formation of higher quality alkylate and minimization of the presence of organic fluorides in the alkylation effluent. These acids contact the hydrocarbon countercurrently and pass through a series of sieve trays 56 and downcomers 58. A vortex breaker 60 may be provided. By the employment of a vertical settling vessel of the type illustrated, it is easier to support the vessel and also provides, if desired, additional storage space underneath said vessel for acid storage or the like in acid storage tank 62. The acid catalyst phase is then returned through acid return conduit 48 to acid cooler 64.

Figure 8:
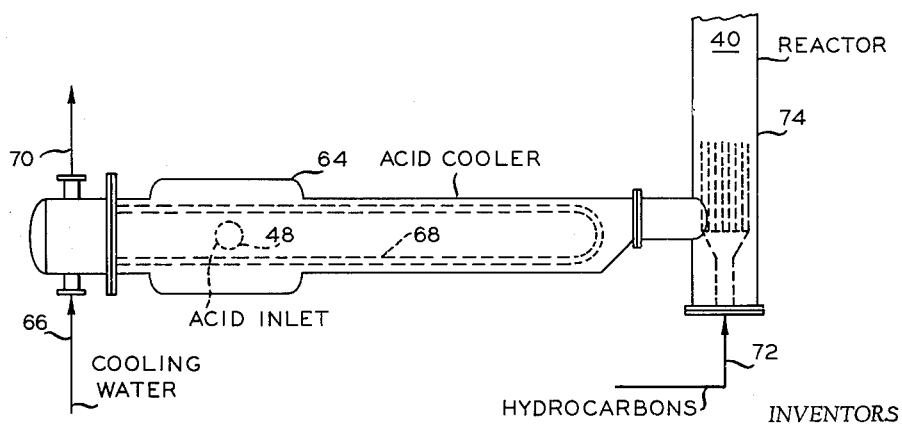
FIGURE 8 is a diagrammatic illustration showing in further detail the horizontal acid cooler, reactor and eduction system for the introduction of hydrocarbons in the apparatus in FIGURE 7.

FIGURE 8 diagrammatically illustrates another view of the cooler, reactor and educting system illustrated in FIGURE 7. Acid cooler 64 is at substantially the same elevation as the lower portion of the reactor 40 and is preferably in a horizontal position. Cooling water is provided through conduits 66, tube 68 and outlet conduit 70. The cooled acid is then introduced from an upper portion of the acid cooler into a lower portion of the reactor 40 so as to prevent collection of hydrocarbons in the upper portion of the cooler. Hydrocarbons are introduced into a lower portion of the reactor through a conduit 72 which swages outwardly into an orifice plate which contains a plurality of tubes 74 or constricted passageways which terminate within the lower portion of the reactor at a point slightly above the point of introduction of the acid catalyst into the reactor. By this apparatus the acid catalyst is thus introduced above the orifice plate and the high velocity, upwardly flowing hydrocarbons thus prevent the accumulation of a stagnant pool of a mixture of catalyst and hydrocarbons. These tubes can terminate at the same elevation within the reactor or at different elevations to provide a uniform distribution of hydrocarbons.

It is apparent from the foregoing description and discussion that the method and apparatus of this invention provides a continuous cyclic flow path of acid through the alkylation system without the necessity of mechanical drivers or agitators in any part of the system. The quantity of acid which is circulated is established by the heat requirements of the alkylation reaction, sufficient acid being circulated to maintain a desired maximum temperature in the alkylation reactor. Specifically, in the alkylation of low boiling olefins with low boiling isoparaffins when employing hydrofluoric acid as the alkylation catalyst, the acid circulation rate through each reactor usually is between about 1 and about 8 volumes per volume of hydrocarbon reactants, preferably from 2 to 4 volumes per volume, and provides a temperature rise in the reactor of between about 1 and about 15° F., preferably less than 10° F. and frequently virtually undetectable. The desired flow rate of acid through the reaction system is obtained in part by imparting the kinetic energy to the hydrocarbons entering the reactor. The quantity of kinetic energy present in the flowing hydrocarbon is a function of the velocity of the hydrocarbons through orifice 31. Broadly this velocity can vary between about 10 and about 150 feet per second; however, usually the velocity is between about 20 and about 80 feet per second and more preferably in the range of 20 to 40 feet per second. The major motive power in the movement of the acid catalyst is the head provided by the difference in density between the acid (14) and the contents of the reactors (18 and 18a). This head can be varied by varying the relative elevations of settler and surge vessel 2 and acid coolers 16 and 16a.

The method and apparatus of this invention provides a number of advantages over the conventional alkylation process and apparatus. The invention eliminates pumps and mixers which are usually constructed of expensive alloy materials and which require complicated packing materials and seals. In addition the invention by eliminating mechanical means for moving and transporting the alkylation acid and reactants substantially eliminates the emulsions which are normally formed in alkylation processes and simplifies the problem of separating the alkylation effluent into acid and hydrocarbon phases. In the present invention the hydrocarbons pass into the continuous acid phase and through the alkylation reactor without a high degree of emulsification as well as providing better temperature control and a higher octane number. As a result the reaction effluent can be effectively separated in a single settling operation. The invention also provides advantages over the prior art in the straightening vanes provided in the settling vessel, which aid in reducing turbulence and contribute to separation of the acid and hydrocarbon phases in a single operation.

The following example is presented in illustration of an application of the invention on a commercial scale.

*Example*

Flows to reactor:                      Lb./hr.
    Hydrocarbon (20 and 20a) _____ 50,000
    Composition:
        Paraffins ____ 13.5 Wt. percent
        Isoparaffins __ 78.6 Wt. percent
        Olefins _____ 7.9 Wt. percent
    Hydrofluoric acid (14) _____ 400,000
    Composition:
        Acid _____ 87.4 Wt. percent
        Paraffins ____ 0.9 Wt. percent
        Isoparaffins __ 6.4 Wt. percent
        Acid soluble
          oil _____ 5.3 Wt. percent Temperatures:                          Degrees F.
    Hydrocarbon to reactors (20 and 20b) _____ 80
    Hydrofluoric acid to coolers (16 and 16a) ____ 80
    Hydrofluoric acid from coolers (16 and 16a) ___ 70
    Reaction effluent (6 and 8) _____ 80

Pressures:                               P.s.i.a.
    Reactors (18–18a)—
        Top _____ 200
        Bottom _____ 212
    Settler surge vessel (2) _____ 200

Approximately half of the hydrocarbon feed is introduced to each of coolers 16 and 16a through an orifice plate containing 24 1-inch schedule 40 pipes.

Straightening vane section 4 in settler-surge vessel 2 is formed from parallel ¼-inch plates two feet long and spaced one foot apart, across the entire cross-section of the settler and surge vessel. The length of the settler surge vessel measured along the longitudinal axis from tangent line to tangent line is 25 feet, 0 inch.

Having thus described the invention by providing a specific example thereof it is to be understood that no undue limitations or restrictions are to be drawn by reason thereof and that many variations and modifications are within the scope of the invention.

We claim:

1. A process for reacting a liquid alkylatable hydrocarbon with a liquid alkylating agent in the presence of a liquid alkylation catalyst which passes through a cyclic path including in series and in open communication a vertically extended reaction zone, a settling zone, a cooling zone and return to said reaction zone, solely by energy imparted to said catalyst by flowing hydrocarbons and density differential in said zones, which comprises introducing a liquid mixture comprising an alkylatable hydrocarbon and an alkylating agent as a plurality of upwardly flowing, high velocity streams into the lower portion of said reaction zone containing said catalyst as the continuous phase, maintaining suitable conditions of temperature and residence time in said reaction zone whereby said alkylatable hydrocarbon is alkylated, passing alkylation reaction effluent comprising said catalyst, alkylate and unconsumed reactants from the upper portion of said reaction zone into said settling zone wherein phase separation takes place to provide a catalyst phase and a hydrocarbon phase, withdrawing hydrocarbons from said settling zone, passing catalyst from said settling zone downwardly into said cooling zone and passing cooled acid from the cooling zone upwardly into the lower portion of said reaction zone and upstream from the point of introduction of said liquid mixture so that said catalyst is flowing in the same direction as said mixture at the point of their initial contacting.

2. The process of claim 1 in which the alkylatable hydrocarbon is an olefin, the alkylating agent is an isoparaffin and the catalyst is hydrofluoric acid.

3. A process for reacting a liquid olefin hydrocarbon with a liquid isoparaffin hydrocarbon in the presence of liquid hydrofluoric acid catalyst which passes through a cyclic path including in series and in open communication a vertically extended reaction zone, a vertically extended settling zone, a cooling zone at substantially the same elevation as said reaction zone and return to said reaction zone, solely by energy imparted to said acid catalyst by flowing hydrocarbons and density differential in said zones, which comprises introducing a liquid mixture comprising an olefin hydrocarbon and an isoparaffin hydrocarbon as a plurality of high velocity streams into the lower portion of said reaction zone containing said acid catalyst as the continuous phase to form rising drops of liquid mixture in said acid, maintaining suitable conditions of temperature and residence time in said reaction zone whereby said alkylatable hydrocarbon is alkylated with a temperature gradient of about 4 to 15° F., passing alkylation reaction effluent comprising said acid catalyst, alkylate and unconsumed reactants from the upper portion of said reaction zone into said vertically extended settling zone wherein phase separation between the hydrocarbon and acid takes place, flowing said effluent during separation of the hydrocarbon and acid phases through at least one series of parallel flow paths of restricted cross-section and length to minimize turbulence and mixing of said effluent, separately withdrawing said hydrocarbon phase from the upper portion of said settling zone and acid phase from the lower portion of said settling zone, passing the acid phase downwardly into said cooling zone and passing cooled acid from the cooling zone upwardly into the lower portion of said reaction zone and upstream from the point of introduction of said liquid mixture so that said catalyst is flowing in the same direction as said mixture at the point of their initial contacting.

4. The process of claim 3 wherein make-up hydrofluoric acid is introduced into the upper portion of said settling zone and flows downwardly countercurrent to said hydrocarbons to reduce the concentration of fluorides in said hydrocarbons.

5. A process for reacting a liquid olefin hydrocarbon with a liquid isoparaffin hydrocarbon in the presence of liquid hydrofluoric acid catalyst which passes through a cyclic path including in series and in open communication a vertically extended reaction zone, a settling zone, a cooling zone and return to said reaction zone, solely by energy imparted to said acid by flowing hydrocarbons and density differential in said zones, which comprises introducing a liquid mixture comprising an olefin hydrocarbon and an isoparaffin hydrocarbon upwardly as a plurality of high velocity streams into the lower portion of said reaction zone containing said acid as the continuous phase to form rising drops of liquid mixture in said acid, maintaining suitable conditions of temperature and residence time in said reaction zone whereby said olefin hydrocarbon is alkylated with a temperature gradient of about 4 to 15° F., passing alkylation reaction effluent comprising said acid, alkylate and unconsumed reactants from the upper portion of said reaction zone into one end of said settling zone wherein phase separation between the hydrocarbon and acid takes place, flowing said effluent during separation of the hydrocarbon and acid phases through at least one series of parallel flow paths of restricted cross-section and length in a region adjacent the point of entry of the reaction effluent to said settling zone to minimize turbulence and mixing of said effluent, passing said effluent further through said settling zone, separately withdrawing from said settling zone at the opposite end acid and hydrocarbon phases, passing the acid phase downwardly into said cooling zone which is substantially at the same elevation as the lower portion of said reaction zone and passing cooled acid from said cooling zone upwardly into the lower portion of said reaction zone and upstream from the point of introduction of said liquid mixture so that said acid is flowing in the same direction as said liquid mixture at the point of their initial contacting.

6. Alkylation apparatus comprising in combination a vertically elongated reactor; a horizontally elongated settler openly communicating at one end portion with the upper portion of said reactor; a downwardly extending conduit in communication with the opposite end of said settler and a heat exchanger disposed in elevation below said settler and at about the same elevation as the lower portion of said reactor, said reactor, settler and heat exchanger forming a closed, continuous circuit for flow; means for initially introducing acid to said system; a plurality of vertically disposed tubes terminating within the lower portion of said reactor for introducing liquid reactants as a plurality of streams of small cross-section and high velocity upwardly into said reactor; a plurality of passageways around said tubes for the passage of acid from said cooler upwardly into said reactor; means for passing a cooling medium through said heat exchanger and means for withdrawing hydrocarbon from the upper portion of said settler.

7. The apparatus of claim 6 wherein said settler contains at least one means for reducing turbulence therein.

8. The apparatus of claim 6 wherein the lower extremity of said tubes terminate within the interior of said heat exchanger in a single conduit for the introduction of hydrocarbons.

9. Alkylation apparatus comprising in combination a vertically elongated reactor; a vertically extended settler openly communicating with the upper portion of said reactor; a downwardly extending conduit in communication with the lower portion of said settler and a heat exchanger disposed in elevation below said settler and at about the same elevation as the lower portion of said reactor, said reactor, settler and heat exchanger forming a closed continuous circuit for flow; means for initially introducing acid to said system; a plurality of vertically extending tubes terminating within the lower portion of said reactor for introducing liquid alkylation reactants upwardly into the lower portion of said reactor; passageways around said tubes in communication with the interior of said heat exchanger for flowing cooled acid upwardly and in the same direction of flow as the reactants into the lower portion of said reactor; means for passing a cooling medium through said heat exchanger and means for withdrawing hydrocarbon from the upper portion of said settler.

10. The apparatus of claim 9 wherein the lower extremity of said tubes terminate in a single conduit within the lower portion of said reactor below the point of introduction of said acid from said heat exchanger.

References Cited by the Examiner

UNITED STATES PATENTS

| | | | |
|---|---|---|---|
| 2,386,681 | 10/45 | Hadden | 260—683.52 |
| 2,720,447 | 10/55 | Jones et al. | 260—683.58 |
| 2,859,259 | 11/58 | Stiles | 260—683.48 |
| 2,886,681 | 5/59 | Hadden | 260—683.48 |
| 3,006,739 | 10/61 | Van Pool | 260—683.48 |
| 3,080,438 | 3/63 | Sailors | 260—683.48 |
| 3,108,048 | 10/63 | McDonald | 260—683.58 |

FOREIGN PATENTS 559,200    2/44    Great Britain.

ALPHONSO D. SULLIVAN, *Primary Examiner.*